United States Patent [19]

Phillips

[11] Patent Number: 4,839,818

[45] Date of Patent: Jun. 13, 1989

[54] MAGNET WIRE OVEN CONTROL APPARATUS

[75] Inventor: James L. Phillips, Fort Wayne, Ind.

[73] Assignee: Essex Group, Inc., Fort Wayne, Ind.

[21] Appl. No.: 101,325

[22] Filed: Sep. 25, 1987

[51] Int. Cl.$^4$ .................. G06F 15/46; G06F 15/16
[52] U.S. Cl. .................. 364/477; 364/188;
364/148; 364/150; 364/146; 364/138; 364/140;
427/117; 427/372.2
[58] Field of Search ............ 364/477, 189, 188, 200,
364/900, 148, 150, 146, 138, 140; 427/177, 178,
117, 379, 372.2

[56] References Cited

U.S. PATENT DOCUMENTS

| | | | |
|---|---|---|---|
| 3,781,161 | 12/1973 | Schuss | 431/16 |
| 3,849,056 | 11/1974 | Schuss | 431/24 |
| 4,391,848 | 7/1983 | Hilker | 427/178 |
| 4,406,399 | 9/1983 | Furuta et al. | 236/15 |
| 4,418,381 | 11/1983 | Milusis et al. | 364/188 |
| 4,437,152 | 3/1984 | Jones | 364/189 |
| 4,448,578 | 5/1984 | Brunet et al. | 432/72 |
| 4,521,173 | 6/1985 | Hilker et al. | 427/117 |

FOREIGN PATENT DOCUMENTS 0071262 2/1983 European Pat. Off. ............ 364/477

Primary Examiner—Jerry Smith
Assistant Examiner—P. Gordon
Attorney, Agent, or Firm—Francis J. Maguire, Jr.;
Edward L. Kochey, Jr.

[57] ABSTRACT

A magnet wire oven for an in-line drawing fabrication process is controlled by means of a local operator control station having a plurality of menu screens stored therein for operator call-up and control via a remote controller for controlling a plurality of oven parameters. The remote controller is located in an output of the way location so as to efficiently utilize floorspace while at the same time controlling a large number of parameters in one main controller unit. The local operator station comprises a local signal processor, a keyboard, a display and an input/output port. The remote controller comprises a remote signal processor, a multiplexer and a plurality of analog loop controllers. The remote controller may also include either analog or digital input-/output devices or both.

3 Claims, 4 Drawing Sheets

OVEN 207 * * * INITIAL SCREEN
INSTRUCTIONS:
PRESS KEY BELOW FOR DESIRED FUNCTION
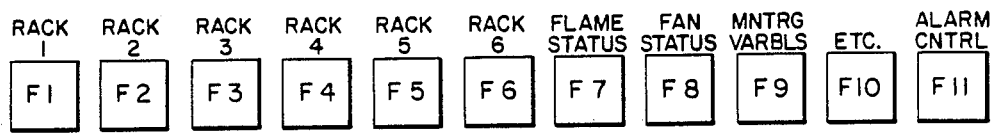
FIG. 5
OVEN 207 * * * RACK 1
FIG. 6
OVEN 207 * * * RACK 1, LOOP 1-4
|   |   | MEASURED x100 | SET POINT x100 | OUTPUT |
|---|---|---|---|---|
| 1 | INCINERATOR FAN PRESSURE | 60 IWC | 175 IWC | 100% |
| 2 | FRESH AIR FAN PRESSURE | 470 IWC | 460 IWC | 0% |
| 3 | EVAP ZONE FAN PRESSURE, SIDE A | 215 IWC | 105 IWC | 0% |
| 4 | CURE ZONE FAN PRESSURE, SIDE A | 300 IWC | 5 IWC | 0% |
TO CHANGE SET POINT:
1) ENTER LOOP NUMBER
2) ENTER NEW SET POINT
LOOP NO.     SET POINT
EXIT SCRN
F 10
FIG. 7

MAGNET WIRE OVEN CONTROL APPARATUS

DESCRIPTION

1. Technical Field

This invention relates to the manufacture of magnet wire and, more particularly, to apparatus for controlling a magnet wire baking oven.

2. Background Art

As this invention relates to an apparatus for controlling a magnet wire oven, it is necessary to understand the basics of the oven itself to fully appreciate the need and desirability for such an apparatus.

Magnet wire ovens are used to cure an electrically insulating film (enamel) on metal wire. This wire's end use is in coils which produce electromagnetic fields as found in electric motors, transformers, relays, etc. It is extremely important that enamel film be cured to the proper degree to produce the optimum electrical and mechanical properties.

Much of today's magnet wire insulation is produced in two enamel coats. The base coat is formulated to give optimum electrical insulating properties and the top coat enhanced mechanical properties, such as a low coefficient of friction so that the wire will readily pass through high speed coil winding equipment without film damage.

The rate at which the film is cured, and thus the efficiency of the oven, is controlled by both the temperature and the velocity of the air passing over the wire. It is these two parameters which must be closely controlled.

Previous ovens were at most split into two zones: (i) an evaporation zone where the heat is applied at a controlled rate so that the solvents can be evaporated from the enamel without forming beads and blisters in the film surface, and (ii) a cure zone where the heat is applied at a higher rate to quickly cure the film. In this type of oven the base and top coat saw the same temperature profile even though for optimum properties different temperatures were required by the chemistry of the enamels. In the new oven design which the apparatus of the present invention controls, an attempt is made to apply heat to the wire in the most optimum manner. Thus, in this oven there is a preheat zone to heat the wire before it enters the enamel applicator, and separate evaporation and cure zones for both the base coat and top coat. To be more cost effective two ten wire line ovens are built side by side as one oven and connected to a common thermal fume incinerator.

To control all of this requires nine burners, six variable speed fans, eighteen controlled dampers, and an array of safety interlocks. The actual numbers are not important but rather the fact that this is now a complex system requiring a large number of controls. If past design practices were used these controls would be located in a large control panel which, due to space limitations, would be located remote from the oven. Thus it would be inconvenient for the operator to make control changes as well as keep close track of control parameters. Also, with the larger number of controls comes the opportunity for increased equipment failures. Thus it becomes apparent that a different type of control system is required.

DISCLOSURE OF INVENTION

The object of the present invention is to provide apparatus for controlling a plurality of sensed parameters relating to a magnet wire oven.

According to the present invention, an operator control station is provided for locally controlling an oven by means of a remote controller located out-of-the-way of the oven so as to permit maximum effective usage of the floor space in a magnet wire fabrication facility. The operator locally controls the oven by means of the control station which has a local signal processor, a keyboard and a display therein. The local signal processor is responsive to operator inputs received via the keyboard. Typically, the operator will input setpoint signals for controlling each of the various controlled parameters and the operator control station will output these setpoint signals for controlling the controlled parameters. These setpoint signals may be displayed immediately but may instead be provided externally first to the remote controller where the setpoint signals are compared to sensed signals and control output signals are adjusted accordingly. By sending the setpoint signals to the remote controller first and sending the setpoint signals back to the operator control station while or after the control function is serviced, the operator is assured that the same setpoint that he inputs at his local operator station is the same setpoint which is being controlled at the remote controller.

The remote controller comprises a remote signal processor, a multiplexer, and a plurality of loop controllers. The remote signal processor is responsive to the setpoint signals provided from the operator control station. It conditions the setpoint signals and provides them at an output thereof. It also provides multiplexer channel select signals according to which particular controlled parameters the setpoints correspond.

The multiplexer part of the remote controller is responsive to the conditioned setpoint signals from the remote signal processor and is also responsive to the channel select signals for providing the conditioned setpoint signals on the channels selected by the select signals.

Each of the plurality of loop controllers is responsive to a selected one of the conditioned setpoint signals provided on a selected output channel of the multiplexer. Each is also responsive to a selected one of a plurality of sensed analog signals for comparing the magnitude of the selected conditioned setpoint signal to the magnitude of the selected sensed analog signal and for providing an output analog control signal for controlling a corresponding parameter to a value indicated by the magnitude of the setpoint signal.

As mentioned previously, it is desirable to route the setpoint signals from the operator control station through the remote controller for control purposes and only then send the setpoint signal back to the operator control station for display. Also sent back to the local operator control station is the sensed value of the controlled parameter for display as well. Thus, the multiplexer is responsive to a plurality of output analog control signals from the loop controllers as well as a corresponding plurality of conditioned setpoint signals from the same loop controllers for routing the signals back to the remote signal processor where they are conditioned or reconditioned (the setpoint signals) and ultimately provided back to the operator control station's local signal processor which then provides them to the display for visual display thereof.

In further accord with the present invention, the remote signal processor may include a first signal processor responsive to the setpoint signals from the operator control station. These signals are stored and a multiplexer channel select signal is generated by the first signal processor according to the parameter to which the setpoint signal corresponds.

The remote signal processor also may include a programmable logic controller, responsive to the setpoint signals from the first signal processor for conditioning the setpoint signals and for providing the conditioned setpoint signals at an output thereof. The programmable logic controller is also responsive to the channel select signals for storing them and providing them at an output thereof.

The remote signal processor may also include a second signal processor, responsive to the conditioned setpoint signals and the channel select signals from the programmable logic controller for storing these signals therein and for providing them at an output thereof.

In still further according with the present invention, the remote controller may include an analog input/output (I/O) device and a digital I/O device.

The analog I/O device is responsive to a plurality of sensed analog signals at a first input thereof and provides digital signal representations thereof as a first plurality of digital signals to the remote signal processor. The analog I/O device is also responsive at a second input thereof to at least one conditioned signal from the remote signal processor indicative of the magnitude of a function of said first plurality of controlled parameters. The analog I/O device converts at least one conditioned signal to analog form and provides the converted signal at an output thereof to a selected loop controller.

In addition to the analog I/O device, the remote controller may also include a digital I/O device responsive to a plurality of sensed digital signals at a first input thereof. It provides the sensed digital signals as a first plurality of digital signals to the remote signal processor for conditioning. The digital I/O device is also responsive, at a second input thereof, to at least one conditioned signal from the remote signal processor for providing such at an output thereof for controlling one or more controlled parameters.

It is highly desirable to have a control system for a magnet wire oven with a small local operator control station that can be located close to the oven and convenient for the operator. This control station, if connected to a remote controller which is located out-of-the-way of the oven, with a small multiconductor cable, it allows the operator full control over all oven systems as well as the ability to monitor all parameters. Further, this system may be set up to automatically monitor all controls and safety devices and notifies the operator of any failures as they occur, in the order in which they occur. Finally, the system automatically records all control parameters at any time. This information is very usefll for quality control reasons, as well as for gaining a better understanding of the process.

These and other objects, features and advantages of the present invention will become more apparent in light of the following detailed description of a best mode embodiment thereof, as illustrated in the accompanying drawing.

BRIEF DESCRIPTION OF THE DRAWING

FIGS. 5–7 are illustrations of display screens, such as may be provided on the display of the local operator control station.

BEST MODE FOR CARRYING OUT THE INVENTION

Figure 1:
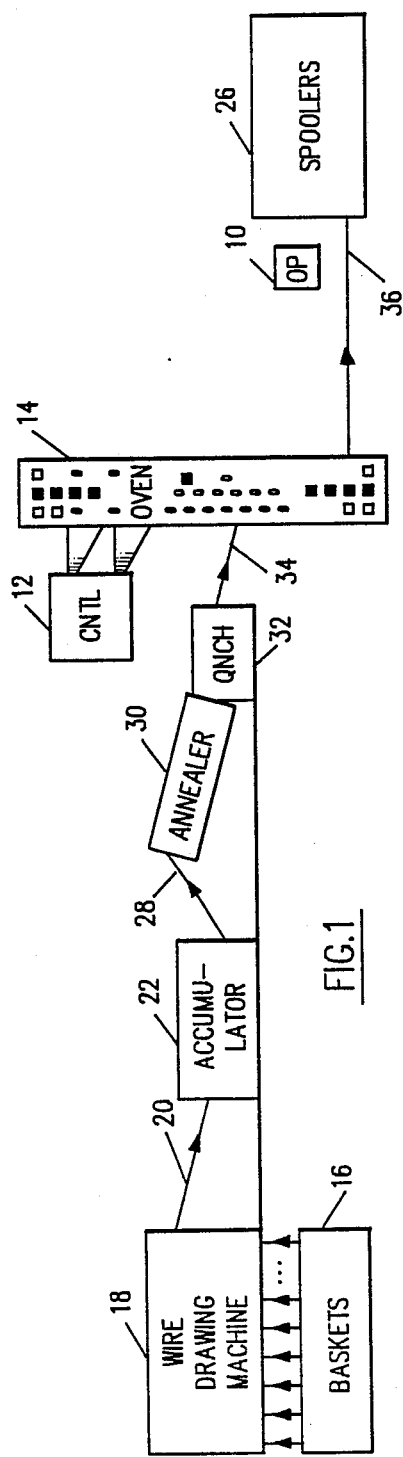
FIG. 1 is an illustration of a wire drawing apparatus in-line with an enameling process.

FIG. 1 is an illustration (not to scale) of an in-line wire drawing process for fabrication of magnet wire. Included within the FIG. 1 is a local operator control station 10 for controlling the cure process by means of a remote controller 12 to which it is connected by a multiconductor cable. The controller is also connected to a plurality of controlled units within a curing oven 14. These may, for example, include nine burners symbolized by darkened squares, six variable speed fans symbolized by light colored squares, eighteen controlled dampers symbolized by circles and an array of safety interlocks (not shown). The actual control format for controlling the various controlled units will not be described in detail as such does not involve the invention.

Heavy gauge wires are provided from a plurality of wire baskets 16. The wires are pulled up out of the baskets into a wire drawing machine 18 which draws the wire down to a smaller gauge and provides a plurality of smaller gauge wires on a plurality of lines 20 to an accumulator 22. Since a large plant will have a very large number of fabrication lines in operation simultaneously, such will draw a considerable amount of electrical power, and there can often be no economical provision of in-house electrical power for these machines. Therefore, they are normally fed from the utility grid. As such, they are subject to the fluctuations in the grid, which occur frequently. On the other hand, the spooling process, or take-up of wire onto a plurality of spools as shown by spoolers 26, is driven by means of an in-house electrical power source, not subject to the normal fluctuations present on the utility power grid. It is necessary to feed the spoolers' capstan with in-house power because of the criticality of the enameling and baking process, particularly for high speed wire fabrication processes. With the wire drawing machine fed by a power source which is subject to voltage dips and the spoolers' capstan still pulling at full speed during such a power dip, the wires will break if the accumulator 22 does not have sufficient wire slack available to provide accumulated wire to the capstan during the drawing machine slowdown.

Wire 28 leaving the accumulator enters an annealer 30 which heats the wire and suddenly cools th wire in a quencher 32 at the exit thereof.

Wire 34 leaving the quencher enters the oven 14 where it is dipped in liquid enamel, baked, redipped and rebaked repeatedly until the desired electrical and mechanical properties have been provided.

At that point, wires 36 are provided to the spoolers 26 and wire is spooled on spools therein.

Figure 2:
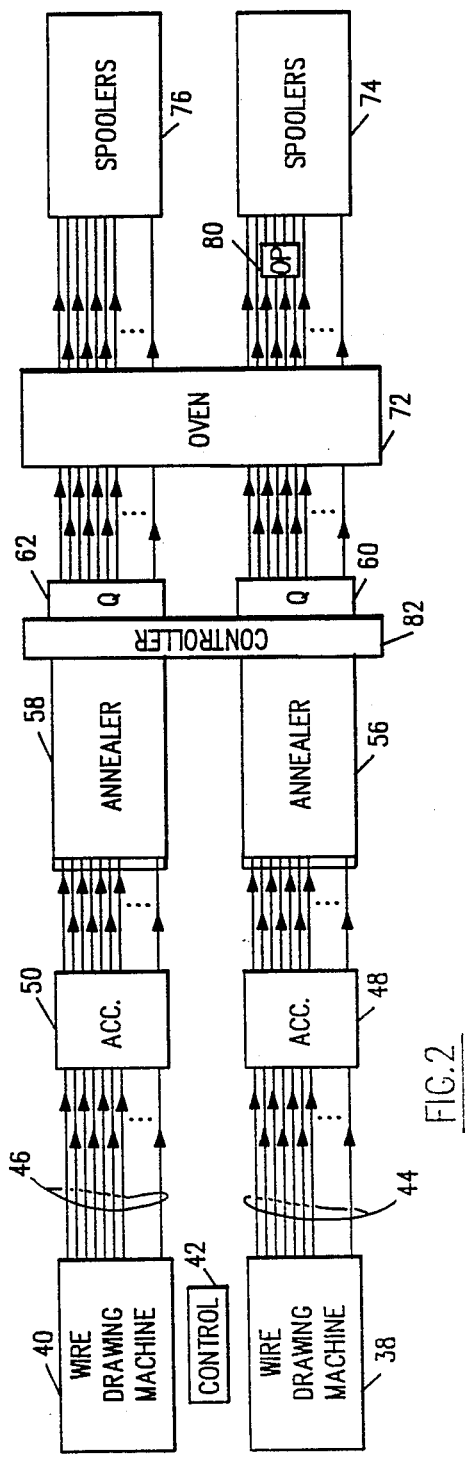
FIG. 2 is a top view of two wire fabrication lines similar to the line shown in FIG. 1 except as viewed from above.

FIG. 2 is an illustration showing a pair of in-line wire drawing machines 38, 40 similar to that of FIG. 1 except viewed from above. A control 42 includes a plurality of variable speed drive controllers for controlling a plurality of variable speed motors in the drawing machines 38, 40. The drawing control 42 is, for the purpose of this disclosure, separate from an oven control to be described below (similar to the control 10, 12 of FIG. 1) and can be designed to provide independent drawing control. However, it will be understood that the drawing and spooling processes can be made interdependent.

It will also be understood that in a large magnet wire fabrication plant there will be dozens of such in-line drawing-annealing-enameling processes for fabricating magnet wire. To achieve maximum efficient use of floor space in such a factory each fabrication line will be as close to the other fabrication lines as possible. Therefore, the two in-line processes pictured in FIG. 2 should be thought of as only two in-line processes among a large plurality of such in-line processes, all adjacent to one another and filling up a factory floor.

A plurality of small gauge wires 44 emerge from wire drawing machine 38 and a plurality of wires 46 similarly emerge from machine 40. Accumulators 48, 50 receive the two groups of wires 44, 46, respectively, and in turn provide the wires to a pair of annealers 56, 58 including quenchers 60, 62. The wire is then provided to an oven 72 where the wires are dipped, baked, redipped and rebaked repeatedly until emerging for spooling on spoolers 74, 76. The oven 72 is controlled by means of a local operator control station 80 which is convenient to the oven operator and which, in turn, controls the various components by means of a remote controller 82 which is raised up above the annealers 56, 58, for example, on a catwalk, as is similarly shown in FIG. 1 for controller 12.

Figure 3:
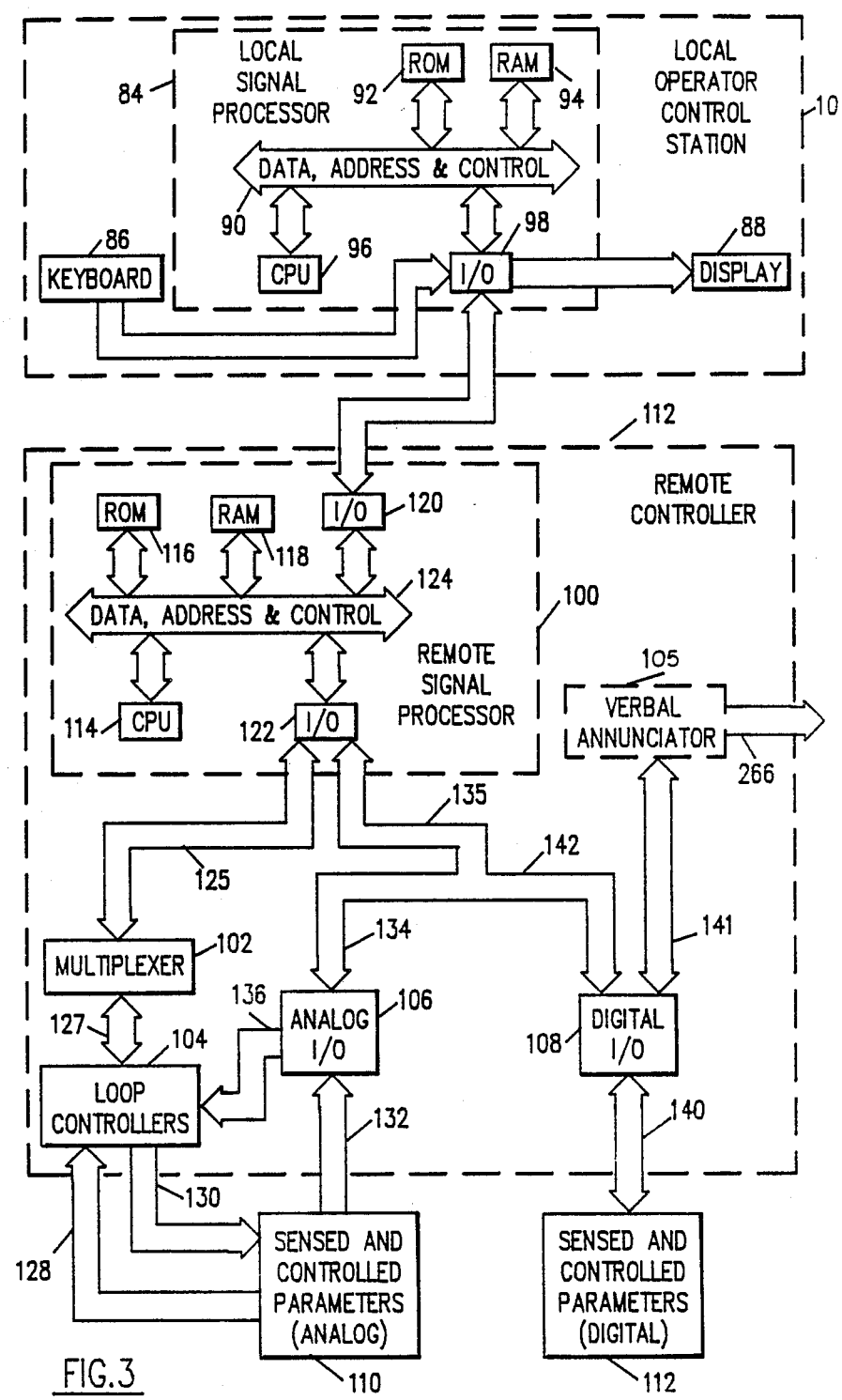
FIG. 3 is a simplified block diagram illustration of a local operator control station used for controlling ovens such as those of FIGS. 1 and 2 by means of a remote controller, according to the present invention.

FIG. 3 is an illustration of the local operator control station 10 of FIG. 1 which is shown interconnected to the remote controller 12, also of FIG. 1.

The local operator control station 10 includes a local signal processor 84, a keyboard 86 and a display 88. The operator station may be a Nematron IWS 1503. Such a self-contained unit consists of a CRT display screen, a 34 key touch pad and a dedicated processor all mounted in an industrial enclosure. User created screens such as those to be briefly described by way of example in FIGS. 5-7 can be stored in the Nematron's memory. Screens may be created by the designer to allow the operator to start and stop fan motors and burners, set temperatures, control dampers, and observe all necessary oven functions. In addition, there may be screens provided to control and monitor the fault alarms and record faults in the order in which they occur. To record data the design may provide screens that give instructions for connecting a printer and provide for the dumping of memory unto a hard copy. The operator station can be mounted as shown in FIG. 1 near the operator's work area and connects to the remote controller 12 via a small four conductor cable.

The local signal processor 84 shown in FIG. 3 includes a data, address and control bus 90, a read only memory (ROM) 92, a random access memory (RAM) 94, a central processing unit (CPU) 96 and an input/output (I/O) port 98. This may be thought of as the dedicated processor provided by the Nematron manufacturer or may be thought of as an off-the-shelf general purpose signal processor. For such a processor, the ROM would be used to store the screens while the RAM would be used to store sensed signal values, intermediate values and setpoints, for example. The CPU is used for manipulating signal values and may also be used for performing calculations. The I/O port is used for receiving inputs from the keyboard, for providing and receiving signals to and from the remote controller 12 and for displaying the screens stored in ROM, and the setpoints, sensed values, etc., relating thereto.

The remote controller 12 includes a remote signal processor 100, a multiplexer 102, a plurality of loop controllers 104, and may also include a plurality of analog input/output (I/O) units 106 and another plurality of digital I/O units 108.

The function of the remote controller 12 is to receive setpoint signals from the local operator control station 10 which are used as reference signals for commanding levels of a plurality of controlled parameters, to sense the present level of the controlled parameters, and to provide control signals for controlling the controlled parameters at the setpoint levels.

FIG. 3 contains a block 110 symbolizing the analog sensed parameters which are controlled by the remote controller 12. FIG. 3 also includes a block 112 symbolizing a plurality of digitally sensed and controlled parameters. Since the analog and digital I/O units 106, 108 are optional, the digitally sensed controlled parameters 112 are not necessarily part of the controlled parameters. However, even if the analog I/O units 106 were not included in the remote controller there would still be analog sensed and controlled parameters 110 due to the nature of the analog loop controllers 104.

The remote signal processor 100 is illustrated as having a CPU, a ROM 116, a RAM 118, and I/O units 120, 122, all communicating with a data, address and control bus 124. The remote signal processor 100 may be thought of as a general purpose signal processor having a program stored in its ROM and which is responsive to the set point signals from the operator control station for conditioning the setpoints and for providing conditioned versions thereof at the output port 122 thereof on a line 125. Furthermore, the remote signal processor may be used to provide multiplexer channel select signals at the output port 122 for controlling the multiplexer 102.

The multiplexer is of course responsive to such a signal on line 125 and routes the conditioned setpoint signals to the proper loop controllers 104 on a line 127.

The loop controllers are each responsive to a selected one of the conditioned setpoint signals provided on the various selected output channels of the multiplexer. The loop controllers are also responsive to the sensed analog signals 110 on a line 128 and compare the magnitudes of those sensed signals to the magnitudes of the setpoint signals and in turn provide control signals on a control line 130 back to the controlled parameters which may be controlled by analog devices.

It is sometimes necessary to take in a number of analog sensed signals and condition those signals to come out with a single result which may be a function of the plurality of sensed signals. In such cases, it is necessary to take in a plurality of such sensed signals on a signal line 132 which are provided to the analog I/O unit 106 for provision over a signal line 134 to the remote signal processor 100 on a line 135. There, the plurality of signals provided on 132 are conditioned according to a functional relationship and a single output signal is provided back to the analog I/O unit 106 via signal lines 135, 134 from the remote signal processor 100. This single signal is then provided over a signal line 136 to a loop controller and is used therein as a sensed signal to be compared with a setpoint signal received from the local operator control station over line 127. This results in a control signal over signal line 130 to an analog device for controlling a controlled parameter.

It will also be understood by those skilled in the art that it is sometimes necessary to digitally sense controlled parameters such as those pictured symbolically in block 112 by means of the digital I/O unit 108 pictured in the remote controller 12 of FIG. 3. Such signals are typically simply on-off type signals such as contacts may be sampled over a signal line 140 and provided to the remote signal processor 100 via a signal line 142 and signal line 135 for conditioning. After conditioning, a control signal can be provided by the remote signal processor back over signal lines 135, 142 to the digital I/O unit 108 for being output over signal line 140 to the controlled parameter, typically an on-off function.

Figure 4:
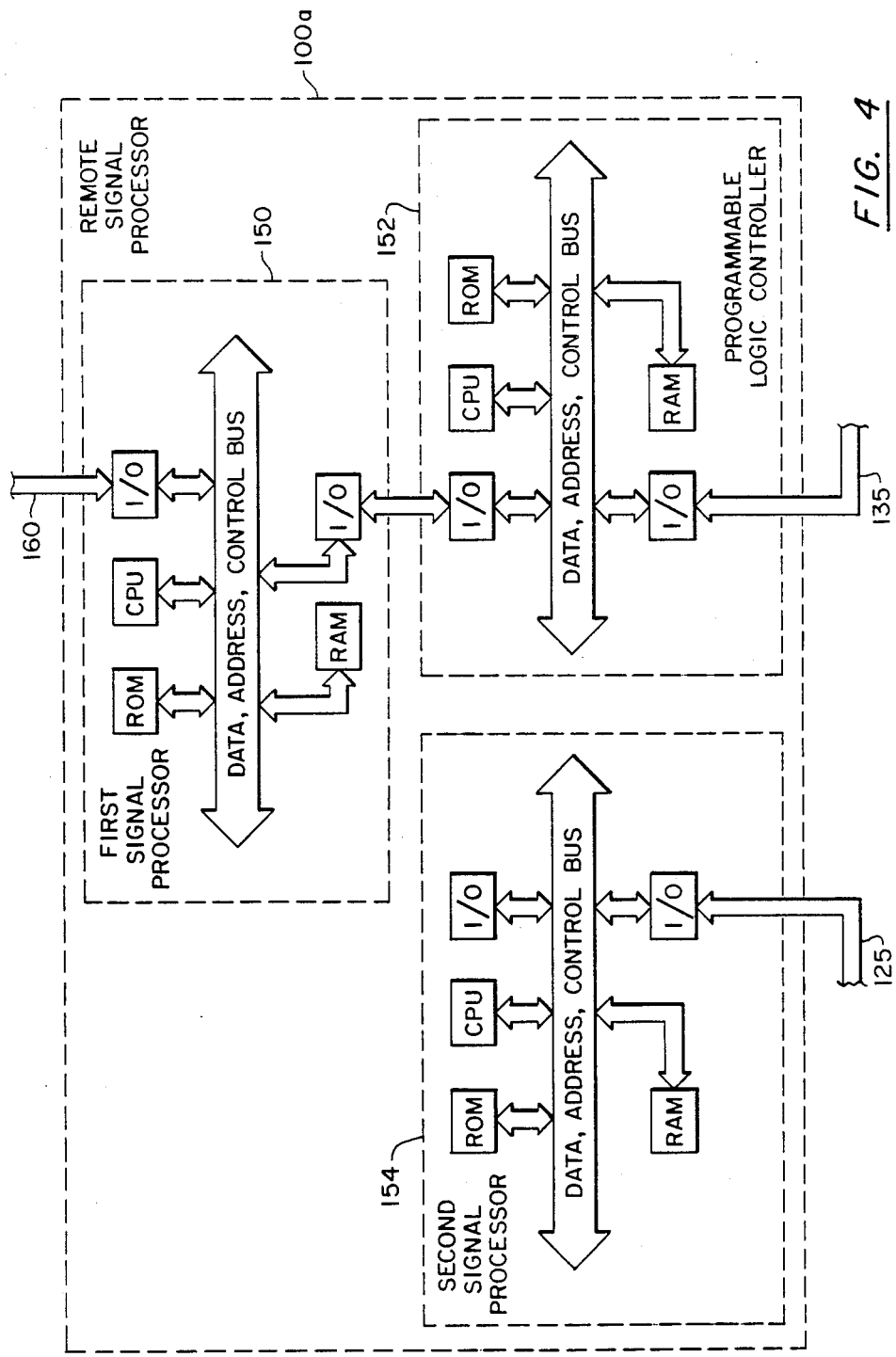
FIG. 4 is a simplified block diagram illustration of the remote signal processor of FIG. 3.

Referring now to FIG. 4, an illustration is there provided of an alternative remote signal processor 100a which may be substituted for the remote signal processor 100 of FIG. 3. The substitute remote signal processor 100a includes a first signal processor 150, a programmable logic controller 152 and a second signal processor 154. The substitute remote signal processor 100a is responsive to the same signals and provides the same signals as provided by the remote signal processor 100 of FIG. 3.

Each of the entities 150, 152, 154 pictured in FIG. 4 is shown as having a signal processor architecture, as described previously in connection with the local signal processor 84 and the remote signal processor 100 of FIG. 3.

The first signal processor 150 may be a Square D D-Log module which is essentially a BASIC language computer. The program in this module is user created and thus can be modified when and if control requirements change.

The second signal processor 154 may also be a Square D D-Log module. Both the first and second signal processor 150, 154 communicate with one another through the programmable logic controller 152 which may be a Square D Model 700 Programmable Logic Controller. The Model 700 can be programmed in ladder control logic which in turn uses the digital inputs from the digital I/O units 108 and provides digital outputs thereto. The digital I/O unit 108 can contain modules which control such functions as starting and stopping of fans and burners, operating solenoid valves, monitoring and responding to safety interlocks and controlling fault alarms. The Model 700 also interfaces with the analog I/O units 106 which can read such parameters 110 as wire speed, gas usage and pressures in the oven. Also, Model 700 generated analog signals can be sent to the loop controllers 104 as inputs, as previously described.

A printer (not shown) can be connected to the operator control station 10 to generate a hard copy document of oven parameters.

Referring back to FIG. 3, the multiplexer 102 may be a Quasitronics Intelligent Data PBX. The loop controllers 104 may comprise a West Octet control system. This system consists of six racks of eight circuit cards each, each card capable of complete proportional-integral-derivative (PID) control. The user can select any of the standard industrial inputs and outputs for each loop, such as, for example, thermocouple in and valve motor drive out. Each rack has an associated small operator station (not shown) that allows all control parameters of all eight loops to be set at the remote controller. I.e., these stations are located on the remote controller 12. In addition, the racks can communicate via an RS422 link 160 to the rest of the system, thus allowing the operator to set and read the necessary control parameters through the main Nematron control station 10.

The analog I/O unit 106 may comprise several Square D register input and output modules of the type 8030 RIM 121 and 8030 ROM 121, without limitation. Similarly, the digital I/O units may comprise Square D 8030 DIM 101 units and 8030 DOM 221 units. A typical application may include, for example, thirty-two digital inputs, nine digital outputs, three analog inputs and two analog outputs.

Referring now to FIG. 5, an illustration is there provided of an initial screen for an oven which is displayed on a typical display screen for a typical local operator control station. If the operator control station is a Nematron IWS 1503 there will be a horizontal array of push buttons under the screen numbered F1–F11. Any function may be assigned to any particular push button and a number of such functions have been selected for the push buttons selecte in FIG. 5. For example, by pressing the F1 push button the operator can select a screen entitled RACK 1 which will give him the option of selecting again between loops 1–4 and loops 5–8 as shown in FIG. 6. The operator will then select, for example, to depress push button F1 which will result in the appearance of the screen pictured in FIG. 7 upon the display. As will be observed from FIG. 7, four different controlled parameters are listed along with the sensed value of the measured parameter, the set point, and the output percent. The operator can change the setpoint, as shown by entering a loop number and by entering a new setpoint. This is done via a numeric keyboard on the Nematron.

Although the invention has been shown and described with respect to a best mode embodiment thereof, it should be understood by those skilled in the art that the foregoing and various other changes, omissions, and additions in the form and detail thereof maybe made therein without departing from the spirit and scope of the invention.

I claim:

1. Apparatus for controlling a plurality of sensed parameters comprising:
   an operator control station for locally controlling a system having a local signal processor, a keyboard and a display, said local signal processor responsive to operator input signals received via said keyboard for providing setpoint signals at an output of said operator control station; and
   a remote controller, comprising:
   a remote signal processor, responsive to said setpoint signals from said operator control station for conditioning said setpoint signals and for providing said conditioned setpoint signals at an output of said remote signal processor and for providing multiplexer channel select signals at an output of said remote signal processor;
   a multiplexer responsive to said conditioned setpoint signals and to said channel select signals for providing said conditioned setpoint signals on selected output channels of said multiplexer; and a plurality of loop controllers, each responsive to a selected one of said conditioned setpoint signals provided on a selected output channel of said multiplexer and responsive to a selected one of a second plurality of sensed analog signals for comparing the magnitude of said selected conditioned setpoint signal to the magnitude of said selected sensed analog signal and for providing an output analog control signal for controlling a parameter to a value indicated by the magnitude of said conditioned setpoint signal, said multiplexer being responsive to a plurality of output analog control signals and to said conditioned setpoint signals from said plurality of loop controllers for routing said output analog control signals and said conditioned setpoint signals to said remote signal processor for storage therein, said remote signal processor conditioning said output analog control signals and reconditioning said conditioned setpoint signals and for providing said conditioned output analog control signals and said reconditioned setpoint signals at an output of said remote signal processor, said operator control station's local signal processor responsive to said conditioned analog control signals and to said reconditioned setpoint signals for providing said conditioned analog control signals and said reconditioned setpoint signals to said display for display thereof.

2. The apparatus of claim 1, wherein said remote signal processor comprises:

a first signal processor, responsive to said setpoint signals from said operator control station for storing said setpoint signals, and for providing said setpoint signals at an output of said first signal processor and for providing multiplexer channel select signals;

a programmable logic controller, responsive to said setpoint signals from said first signal processor for conditioning said setpoint signals and for providing said conditioned setpoint signals at an output of said logic controller, said logic controller responsive to said channel select signals for storing said select signals and for providing said channel select signals at an output of said logic controller;

a second signal processor, responsive to said conditioned setpoint signals and to said channel select signals from said logic controller, for storing said conditioned setpoint signals and said channel select signals and for providing said conditioned setpoint signals and said channel select signals at an output of said second signal processor.

3. The apparatus of claim 1, wherein said remote controller further comprises:

an analog input/output (I/O) device, responsive to a plurality of sensed analog signals at a first input thereof for providing digital signal representations thereof as a first plurality of digital signals, and responsive at a second input thereof to at least one conditioned signal indicative of a function of said first plurality of controlled parameters for converting said at least one conditioned signal to analog form and for providing said converted signal at an output thereof;

a digital input/output device, responsive to a plurality of sensed digital signals at a first input thereof for providing said sensed digital signals as a second plurality of digital signals, and responsive at a second input thereof to at least one conditioned signal for providing said at least one conditioned signal at an output thereof; and said remote signal processor responsive to said first plurality of digital signals indicative of the values of a corresponding first plurality of controlled parameters for conditioning said first plurality of digital signals and for providing said at least one conditioned signal indicative of the magnitude of a function of said first plurality of controlled parameter at an output of said remote signal processor, said remote signal processor responsive to said second plurality of digital signals indicative of the values of a corresponding second plurality of controlled parameters for conditioning said second plurality of signals and for providing said at least one conditioned signal indicative of the magnitude of a function of said second plurality of controlled parameters at an output of said remote signal processor.

* * * * *